US006593261B2

United States Patent
Shinohara et al.

(10) Patent No.: US 6,593,261 B2
(45) Date of Patent: Jul. 15, 2003

(54) SILICON NITRIDE POROUS BODY AND ITS PRODUCTION PROCESS

(75) Inventors: Nobuhiro Shinohara, Kanagawa (JP); Naomichi Miyakawa, Kanagawa (JP); Kanji Arai, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 176 days.

(21) Appl. No.: 09/842,803

(22) Filed: Apr. 27, 2001

(65) Prior Publication Data
US 2001/0036531 A1 Nov. 1, 2001

(30) Foreign Application Priority Data
Apr. 28, 2000  (JP) .................................... 2000-129711

(51) Int. Cl.[7] .................. C04B 35/584; C04B 35/591; B01D 39/20
(52) U.S. Cl. .................. 501/97.1; 501/80; 264/630; 264/683; 428/34.4; 428/553; 428/116; 55/523; 55/DIG. 30
(58) Field of Search .................. 501/80, 97.1, 97.2, 501/97.3; 264/630, 683; 428/34.4, 593, 116; 55/523, DIG. 30

(56) References Cited

U.S. PATENT DOCUMENTS 5,004,709 A * 4/1991 Stranford et al. ............. 501/97
5,750,449 A * 5/1998 Niihara et al. ................ 501/80
5,846,460 A * 12/1998 Matsuura et al. ............. 264/43
6,214,227 B1 * 4/2001 Park et al. ................ 210/210.1

FOREIGN PATENT DOCUMENTS

| GB | 895 769 |   | 5/1962 |
| JP | 06092753 | * | 4/1994 |
| JP | 407265626 | * | 10/1995 |
| WO | WO 88/00933 |   | 2/1988 |

OTHER PUBLICATIONS

J. Pabst, et al., Science of Sintering, vol. 21, No. 3, pp. 155–160, "The Kinetic of Postsintering of Reaction–Bonded Silicon Nitride with Different $\alpha/\beta$ Phase Content", 1989 no month.

C. Kawai, et al., Ceramics International, vol. 24, No. 2, pp. 135–138, "Crystal Growth of Silicon Nitride Whiskers Through a VLS Mechanism Using $SiO_2$—$Al_2O_3$—$Y_2O_3$ Oxides as Liquid Phase", 1998 no month.

* cited by examiner

Primary Examiner—Karl Group
(74) Attorney, Agent, or Firm—Oblon, Spivak, McClelland, Maier & Neustadt, P.C.

(57) ABSTRACT

A silicon nitride porous body which is a body having a generally columnar outer shape and at least two through-holes mutually parallel to one another and which has generally perpendicularly oriented columnar crystals on the surface of the through-holes.

14 Claims, 1 Drawing Sheet

SILICON NITRIDE POROUS BODY AND ITS PRODUCTION PROCESS

The present invention relates to a silicon nitride porous body suitable for removing e.g. dusts or a harmful substance contained in a high temperature exhaust gas, and a process for producing it.

Cordierite honeycomb bodies have been widely used as e.g. a carrier for a catalyst which clarifies an exhaust gas of an automobile, a porous body for removing dusts in a high temperature gas containing e.g. dusts, or a porous body for removing particulates discharged from a Diesel engine.

However, although cordierite is excellent in thermal shock resistance in view of quality of material, it is not necessarily satisfactory in view of e.g. corrosion resistance and heat resistance, and accordingly silicon nitride has been attracting attention, which is excellent in corrosion resistance, heat resistance and mechanical strength.

For example, JP-A-6-256069 proposes a process of baking a molded product comprising silicon nitride particles, clay and an oxide to obtain a silicon nitride porous body, but there is a problem in view of production cost since silicon nitride particles are used as a starting material.

On the other hand, JP-A-1-188479 proposes a process of heat-treating a molded product obtained by using a mixed powder comprising metal silicon particles and silicon nitride particles as a starting material to obtain a silicon nitride porous body, but a large amount of metal silicon tends to remain since the nitriding rate is low, whereby excellent heat resistance and corrosion resistance of silicon nitride may be impaired.

Further, in view of the structure of the porous body, the size of through-holes (hereinafter referred to as cells) of conventional honeycomb bodies is limited in view of e.g. molding, and a porous body having an increased area of contact with a fluid such as gas which passes through the through-holes as flow paths is desired.

It is an object of the present invention to provide a silicon nitride porous body having an increased area of contact with a fluid such as gas which passes through through-holes as flow paths, and a process for producing it.

The present invention provides a silicon nitride porous body which is a body having a generally columnar outer shape and at least two through-holes mutually parallel to one another and which has generally perpendicularly oriented columnar crystals on the surface of the through-holes.

The present invention further provides a process for producing the above silicon nitride porous body, which comprises adding a molding aid and water to a mixture which comprises 100 parts by mass of metal silicon particles having an average particle diameter of from 1 to 150 $\mu$m and from 0.2 to 45 parts by mass, as calculated as $SiO_2$, of silicon oxide particles and wherein the total amount of the metal silicon particles and the silicon oxide particles is at least 80 mass % in the mixture, followed by kneading to obtain a kneaded product, then extrusion molding the kneaded product by means of a mold to obtain an extrusion molded product having a cross-sectional area per through-hole of from 1 to 100 mm², and then heat-treating the extrusion molded product in nitrogen to nitride the metal silicon.

Now, the present invention will be described in detail with reference to the preferred embodiments.

Figure 1:
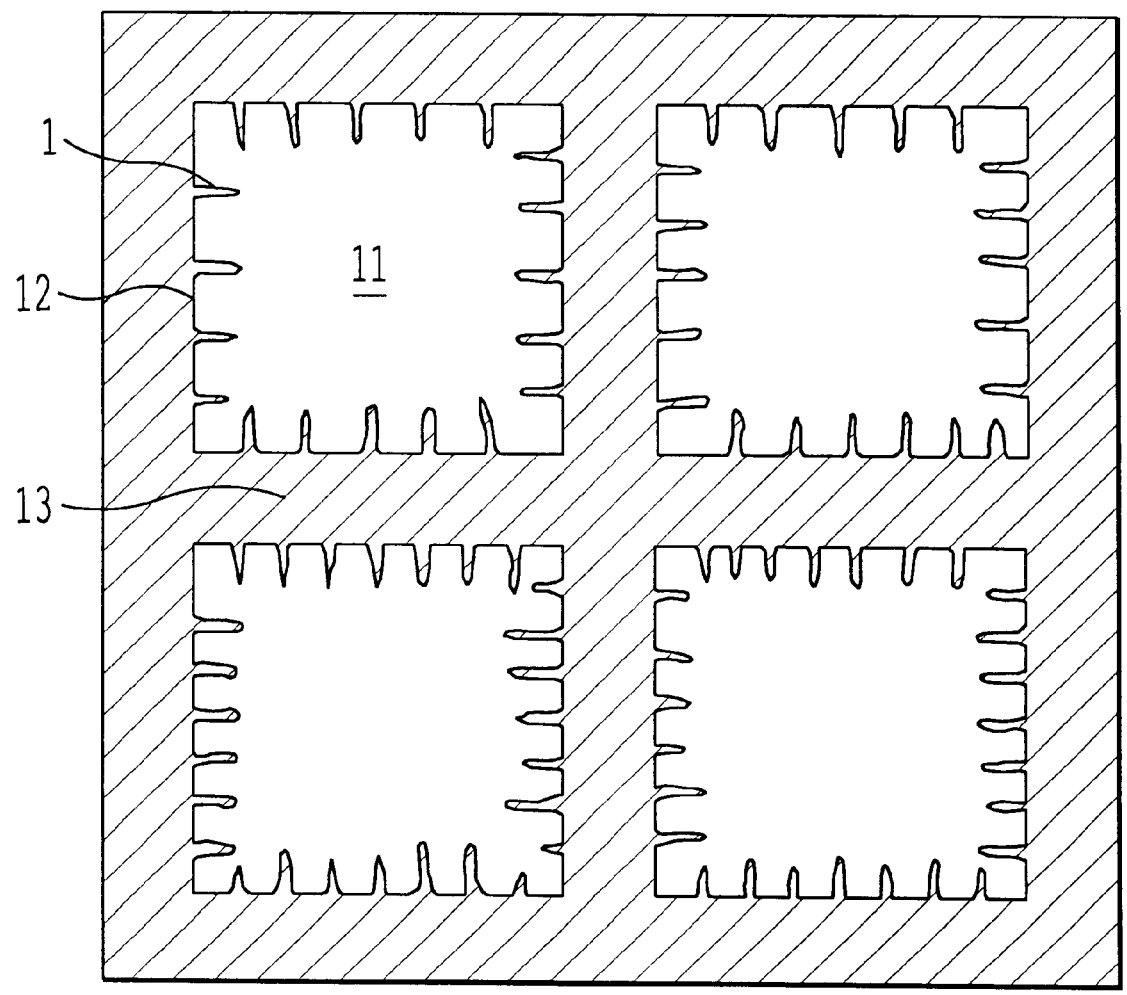
FIG. 1 is a schematic drawing illustrating the silicon nitride porous body of the present invention.

The silicon nitride porous body of the present invention (hereinafter referred to as the present porous body) is a porous body having a generally columnar outer shape and at least two through-holes mutually parallel to one another. On the surface of the through-holes of the porous body, columnar crystals are deposited generally perpendicularly to the surface.

In the present invention, the columnar shape may, for example, be a cylindrical shape, an elliptic cylindrical shape or a prismatic shape. Further, in the present specification, the through-holes are holes penetrated straight, the shape of which is imparted by extrusion molding, and one end of each hole may be sealed checkerwise when used. The present porous body has at least two through-holes mutually parallel to one another. As such a structure of the porous body, a honeycomb structure may be mentioned. The larger the number of the through-holes, the larger the surface area of the through-holes per unit volume of the porous body, and such a porous body is preferred as a filter or a catalyst carrier. Further, the through-holes usually function as flow paths of a fluid such as gas when the present porous body is used as a filter or a catalyst carrier.

The columnar crystals deposited may have any shape of e.g. needle crystals and fibrous crystals comprising needle crystals bunched, so long as they have a columnar shape. The columnar crystals have a length of preferably at least 0.3 mm in the longitudinal direction.

In FIG. 1 is shown a schematic drawing illustrating the porous body of the present invention. FIG. 1 is a cross-sectional view illustrating a honeycomb structure having four cells. Columnar crystals 1 are deposited generally perpendicularly on the surface 12 of through-holes 11. The through-holes 11 are comparted by a porous wall 13.

In a process for producing the present porous body (hereinafter referred to as the present production process), a mixture comprising 100 parts by mass (hereinafter referred to simply as parts) of metal silicon particles and from 0.2 to 45 parts, as calculated as $SiO_2$, of silicon oxide particles, is used.

In the present invention, the metal silicon particles have an average particle diameter of from 1 to 150 $\mu$m. If the average particle diameter of the metal silicon particles is less than 1 $\mu$m, closed pores which make no contribution to filter functions tend to be formed in a large amount, or the pore diameters tend to be too small, whereby filter functions may decrease or pressure loss may increase. On the other hand, if the average particle diameter of the metal silicon particles exceeds 150 $\mu$m, metal silicon particles which do not undergo nitriding tend to remain in the inside of the sintered body, whereby filter properties tend to decrease. The average particle diameter of the metal silicon particles is preferably from 5 to 100 $\mu$m in view of stability in molding and mechanical strength of a filter.

The purity of the metal silicon particles is not particularly limited, but the purity is preferably at least 95 mass % (hereinafter referred to simply as %), whereby the nitriding treatment in nitrogen tends to be accelerated.

In the present invention, as the silicon oxide particles, in addition to silicon oxide particles such as silicon monoxide particles or silicon dioxide particles, particles containing a $SiO_2$ component may, for example, be used. The silicon oxide particles have an average particle diameter of preferably at most 10 $\mu$m. If the average particle diameter exceeds 10 $\mu$m, the $SiO_2$ component may remain as unreacted during the heat treatment in some cases, and it undergoes vitrification at a high temperature, thus causing deformation or decrease in high-temperature strength.

The silicon oxide particles may not only be solid particles but also be hollow particles. The silicon oxide particles are preferably spherical hollow particles, whereby porosity of the porous body to be obtained can be made higher.

The content of the silicon oxide particles in the mixture is from 0.2 to 45 parts, as calculated as $SiO_2$, based on 100 parts of the metal silicon particles. If the content is less than 0.2 part, the amount of the silicon oxide tends to be small, whereby no adequate amount of columnar crystals can be deposited on the surface of the through-holes. If the content exceeds 45 parts, the amount of the silicon oxide tends to be too large, and unreacted silica which makes no contribution to formation of the columnar crystals may remain during the heat treatment, thus causing deformation of the porous body during sintering or decrease in high-temperature strength of the porous body after sintering.

In the present invention, the total amount of the metal silicon particles and the silicon oxide particles is at least 80% in the mixture. If the total amount is less than 80%, shrinkage during drying or during heat treatment tends to be significant, such being unsuitable.

In the present production process, a molding aid and water are added to the mixture comprising the metal silicon particles and the silicon oxide particles, followed by kneading to obtain a kneaded product. The molding aid may, for example, be a binder, a plasticizer, a dispersing agent, a viscosity adjusting agent or a wetting agent.

The molding aid may, specifically, be one member or a mixture of two or more members selected from the group consisting of organic substances such as polyvinyl alcohol or its modified product, starch or its modified product, methyl cellulose, carboxymethyl cellulose, hydroxymethyl cellulose, polyethylene glycol, polypropylene glycol and glycerol.

The blend ratio of the molding aid is preferably within a range of from 10 to 40%, as the outer percentage, based on 100% of the mixture comprising the metal silicon particles and the silicon oxide particles. If the blend ratio is less than 10%, it tends to be difficult to extrusion molding the kneaded product, and if the blend ratio exceeds 40%, the amount of the molding aid tends to be too large, whereby mechanical strength of the porous body may decrease.

Further, the blend ratio of water to be added together with the molding aid is preferably within a range of from 5 to 30% based on 100% of the mixture comprising the metal silicon particles and the silicon oxide particles. If the blend ratio is less than 5%, it tends to be difficult to uniformly mix and knead the composition comprising the metal silicon particles and the hollow particles with the organic component, and if the blend ratio exceeds 30%, the viscosity of the material base tends to decrease, thus causing e.g. failure in shape-retaining properties, whereby molding may be impaired.

For kneading the mixture comprising the metal silicon particles and the silicon oxide particles with the molding aid and water, a kneading machine commonly used in a field of ceramics, such as a ribbon mixer, a Henschel mixer or a kneader, may be used.

In the present production process, the above obtained kneaded product is extrusion molded by means of a mold. As the mold, a mold which makes the extrusion molded product have a cross-sectional area are through-hole of from 1 to 100 $mm^2$, is used. In the present specification, the cross-sectional area are through-hole is a cross-sectional area of a portion corresponding to one cell, in the case of the honeycomb structure for example.

If the cross-sectional area per through-hole is less than 1 $mm^2$, it tends to be difficult to prepare a mold or to carry out molding. Further, if the cross-sectional area per through-hole exceeds 100 $mm^2$, the columnar crystals are hardly deposited, and further, the surface area of the through-holes per volume of the porous body tends to be small, and accordingly when the porous body is used as a filter, a large amount of the porous body will be required, and such is impractical. The porous body preferably has a honeycomb structure as flow paths, whereby the surface area of through-holes per volume of the porous body can be increased.

The mechanism how the columnar crystals deposit is not necessarily understood clearly, but is considered as follows. Namely, the silicon oxide particles contained in the mixture react with a carbon component formed due to decomposition of the organic component such as a binder in the process of the heat treatment to form a gas phase of silicon monoxide. The gas phase of silicon monoxide formed in the flow paths of the porous body reacts with the remaining carbon and nitrogen (reduction-nitriding reaction) to form silicon nitride particles. It is estimated that the formed silicon nitride particles grow on the silicon nitride particles formed on the surface of the through-holes as the cores and form columnar crystals towards the inside of the through-holes.

In the present production process, the above kneaded product is extrusion molded by means of an extrusion molding machine. As the extrusion molding machine, e.g. a single-screw extruder or a twin-screw extruder used in a field of ceramics may optionally be used.

In the present production process, the extrusion molded product is heat-treated in nitrogen to nitride the metal silicon. As heat treatment conditions, the extrusion molded product is preferably heat-treated in a nitrogen atmosphere in two steps. Namely, a first heat treatment step is carried out under conditions suitable for nitriding of the metal silicon particles. A second heat treatment step is carried out under such conditions that the binding between the formed silicon nitride particles is reinforced, and the silicon oxide particles form a gas phase silicon monoxide in the process of the heat treatment so that the columnar crystals deposit in the flow paths of the porous body i.e. on the surface of the filter wall towards the inside of the flow paths.

As conditions of the first heat treatment step, the extrusion molded product is held preferably in a nitrogen atmosphere at a temperature of from 1,200 to 1,400° C. for from 4 to 12 hours. If the temperature is less than 1,200° C., the metal silicon will not undergo nitriding, and if the temperature exceeds 1,400° C., the metal silicon particles tend to melt in the vicinity of the melting point of the metal silicon (1,410° C.), and the shape of the sintered body can not be maintained. Further, if the time of holding the extrusion molded product at said temperature is less than four hours, nitriding of the metal silicon particles tends to be inadequate, and if the time exceeds 12 hours, the nitriding reaction will no longer proceed, and only operating cost increases.

As conditions of the second heat treatment step, the extrusion molded product is held preferably in a nitrogen atmosphere at a temperature of from 1,500 to 1,800° C. for from 1 to 12 hours. If the temperature is less than 1,500° C., no adequate deposition of the columnar crystals may proceeds, and if it exceeds 1,800° C., the silicon nitride particles tend to decompose. Further, if the time of holding the extrusion molded product at said temperature is less than 1 hour, the binding between the particles may not adequately proceed, and if it exceeds 12 hours, silicon nitride is likely to decompose particularly at a high temperature.

The temperature may be lowered once in the middle of the first and second heat treatment steps, or the two steps may be carried out continuously without lowering the temperature.

The temperature raising rate in the heat treatment is optionally selected depending upon the size or shape of the molded product, or the number of the molded product to be heat treated, but it is preferably from 50 to 600° C./hr in view of nitriding rate and control of the pore size. The elapsed time when the temperature is within the range specified for the first or second step, even it is during the temperature raising step, is counted as the holding time in the first or second step.

Further, the nitrogen atmosphere means an atmosphere containing substantially only nitrogen and containing no oxygen, but said atmosphere may contain another inert gas. The nitrogen partial pressure is preferably at least 50 kPa.

Now, the present invention will be described in further detail with reference to Examples and Comparative Example. However, it should be understood that the present invention is by no means restricted to such specific Examples.

Evaluation Items

Pore Properties: The average pore diameter and the porosity were measured by means of a mercury porosimeter (AUTOSCAN-33, manufactured by Yuasa Ionics Inc.)
Structural Analysis: The crystal phase was identified by means of an X-ray diffraction apparatus (Geiger Flex RAD-IIA, manufactured by Rigaku Corporation).
Observation on Shape: Presence or absence of deposition of columnar crystals was confirmed by a scanning electron microscope (JSM-T300, manufactured by JEOL Ltd.)

EXAMPLE 1

With 100 parts of metal silicon particles (Si: 97%, $SiO_2$: 2.1%) having an average particle diameter of 50 $\mu$m, 1 part of $SiO_2$ particles having an average particle diameter of 1 $\mu$m, as silicon oxide particles, was blended to obtain a mixture, and 10% of methyl cellulose, 1% of glycerol and 10% of deionized water, as the outer percentage, based on 100% of said mixture, were added, followed by thorough kneading by a kneader to prepare a base for extrusion molding. The obtained base for extrusion molding was extrusion molded by a vacuum extrusion molding machine having a mold for extruding a honeycomb body to obtain a honeycomb molded product.

As the outer shape of the honeycomb molded product, the diameter was 50 mm, the length was 100 mm, the thickness of the cell wall was 0.25 mm, and the number of the cells was 200 cells/6.4516 $cm^2$. The cross-sectional area per cell i.e. per through-hole was about 3.2 $mm^2$. After the obtained honeycomb molded product was dried, it was heated in an electric furnace in a nitrogen atmosphere from room temperature to 1,300° C. at a temperature raising rate of 200° C./hr and held at 1,300° C. for 10 hours, then heated to 1,750° C. at a temperature raising rate of 60° C./hr and held at 1,750° C. for 5 hours, as two heat treatment steps, to obtain a honeycomb sintered body.

The obtained honeycomb sintered body maintained the shape of the molded product, and no crack or the like was observed either on the surface or in the inside. The sintered body had a porosity of 22% and an average pore diameter of 0.8 $\mu$m, and β-form silicon nitride was identified by x-ray diffraction. Further, the honeycomb sintered body was cut, and the partition wall between the cells was observed by a scanning electron microscope, whereupon it was confirmed that many columnar crystals were deposited generally perpendicularly on the surface of the cell wall toward the inside. It was also observed that some of the columnar crystals had a length of at least 0.8 mm in the longitudinal direction.

EXAMPLE 2

Comparative Example

The same operation as in Example 1 was carried out except that no silicon oxide was blended, metal silicon particles (Si: 99.9%) having an average particle diameter of 10 $\mu$m were used instead of the metal silicon particles (Si: 97%, $SiO_2$: 2.1%) having an average particle diameter of 50 $\mu$m, and the amount of the deionized water was 15% instead of 10%. The obtained honeycomb sintered body was observed by a scanning electron microscope in the same manner as in Example 1, whereupon no deposition of columnar crystals was confirmed.

EXAMPLE 3

The same operation as in Example 1 was carried out except that the temperature in the first heat treatment step was 1,400° C. instead of 1,300° C., and no second heat treatment step was carried out. With respect to the obtained honeycomb sintered body, the crystal phase was identified by x-ray diffraction, whereupon some peaks considered to be attributable to unreacted silicon, in addition to peaks attributable to α-and β-forms silicon nitride, were observed. Columnar crystals having a length at a level of 0.1 mm in the longitudinal direction were observed, but no columnar crystals having a length exceeding 0.3 mm were observed.

EXAMPLE 4

With 100 parts of the metal silicon particles (Si: 99.9%) having an average particle diameter of 10 $\mu$m used in Example 2, 5.3 parts of silica particles ($SiO_2$: 99.9%) having an average particle diameter of 0.1 $\mu$m were blended, followed by dry mixing by a mixer. Based on 100% of this mixed powder, 10% of methyl cellulose, 1% of glycerol and 20% of deionized water, as the outer percentage, were added, followed by thorough kneading by a kneader to prepare a base for extrusion molding. The obtained base for extrusion molding was extrusion molded by means of the same mold and the same vacuum extruder as in Example 1 to prepare a honeycomb molded product. After this honeycomb molded product was dried, it was heated in an electric furnace in a nitrogen atmosphere from room temperature to 1,300° C. at a temperature raising rate of 200° C./hr and held at 1,300° C. for 10 hours, and then heated to 1,750° C. at a temperature raising rate of 60° C./hr and held at 1,750° C. for 5 hours, as two heat treatment steps, to obtain a honeycomb sintered body.

The obtained honeycomb sintered body had a shape similar to that of Example 1, and no crack or the like was observed either on the surface or in the inside. The honeycomb sintered body had a porosity of 33% and an average pore diameter of 1.5 $\mu$m. The honeycomb sintered body was cut and observed by a scanning electron microscope, whereupon it was confirmed that many columnar crystals were deposited generally perpendicularly on the surface of the cell wall toward the inside. It was also observed that some of the columnar crystals had a length of at least 0.9 mm in the longitudinal direction.

EXAMPLE 5

With 100 parts of the metal silicon particles (Si: 98%) having an average particle diameter of 25 $\mu$m, 33.3 parts of alumina (38%)-silica (60%) type hollow particles having an average particle diameter of 50 μm was blended to obtain a mixture, and based on 100% of said mixture, 15% of methyl cellulose, 1% of glycerol and 15% of deionized water, as the outer percentage, were added, followed by thorough kneading by a kneader to prepare a base for extrusion molding.

The obtained base for extrusion molding was extrusion molded by means of the same mold and vacuum extruder as in Example 1 to obtain a honeycomb molded product. After the honeycomb molded product was dried, it was heated in an electric furnace in a nitrogen atmosphere from room temperature to 1,300° C. at a temperature raising rate of 200° C./hr and held at 1,300° C. for 10 hours, and then heated to 1,750° C. at a temperature raising rate of 60° C./hr and held at 1,750° C. for 5 hours, as two heat treatment steps, to obtain a honeycomb sintered body.

The obtained honeycomb sintered body had a diameter of 50 mm and a length of 150 mm, and maintained a honeycomb shape with a thickness of the cell wall of 0.25 mm and a number of cells of 200 cells/square inch, and no crack or the like was observed either on the surface or in the inside. The sintered body had a porosity of 58% and an average pore diameter of 8 μm.

With respect to the obtained honeycomb sintered body, the crystal phase was identified, whereupon it was found that alumina was solid-dissolved in silicon nitride. This honeycomb sintered body was cut and observed by a scanning electron microscope, whereupon it was confirmed that many columnar crystals were deposited generally perpendicularly on the surface of the cell wall toward the inside. It was also observed that some of the columnar crystals had a length of at least 0.7 mm in the longitudinal direction.

The silicon nitride porous body of the present invention has many columnar crystals generally perpendicularly deposited on the surface of through-holes. The through-holes usually function as flow paths through which a fluid such as gas passes, and by deposition of the columnar crystals, a porous body having an increased area of contact with a fluid can be obtained.

Accordingly, when the porous body of the present invention is used as a filter, it can be used as a filter having a large filtration area. Further, when the porous body of the present invention is used as a catalyst carrier, it can also be used as a catalyst carrier capable of supporting a large amount of a catalyst.

The entire disclosure of Japanese Patent Application No. 2000-129711 filed on Apr. 28, 2000 including specification, claims, drawings and summary are incorporated herein by reference in its entirety.

What is claimed is:

1. A silicon nitride porous body having a generally columnar outer shape and at least two through-holes mutually parallel to one another and which has generally perpendicularly oriented columnar crystals disposed on the surface of the through-holes.

2. The silicon nitride porous body according to claim 1, wherein the columnar crystals are silicon nitride columnar crystals.

3. The silicon nitride porous body according to claim 1, wherein the columnar crystals have a length of at least 0.3 mm in the longitudinal direction.

4. The silicon nitride porous body according to claim 1, wherein the columnar crystals are needle crystals.

5. The silicon nitride porous body according to claim 1, wherein the silicon nitride porous body has a honeycomb structure.

6. A process for producing a silicon nitride porous body comprising:
adding a molding aid and water to a mixture comprising 100 parts by mass of metallic silicon particles having an average particle diameter of from 1 to 150 μm and from 0.2 to 45 parts by mass, as $SiO_2$, of silicon oxide particles and wherein the total amount of the metallic silicon particles and the silicon oxide particles is at least 80 mass% in the mixture,
kneading the mixture, molding aid and water to provide a kneaded product,
extrusion molding the kneaded product to provide an extrusion molded product having a cross-sectional area per through-hole of from 1 to 100 mm$^2$, and
heat-treating the extrusion molded product in nitrogen to nitride the metallic silicon, thereby providing a silicon nitride porous body having a generally columnar outer shape and at least two through-holes mutually parallel to one another and which has generally perpendicularly oriented columnar crystals on the surface of the through-holes.

7. The process for producing a silicon nitride porous body according to claim 6, wherein the metallic silicon particles have an average particle diameter of from 5 to 100 μm.

8. The process for producing a silicon nitride porous body according to claim 6, wherein the metallic silicon particles have a purity of at least 95 mass %.

9. The process for producing a silicon nitride porous body according to claim 6, wherein the amount of molding aid is from 10 to 40%, based on 100% of the mixture comprising the metallic silicon particles and the silicon oxide particles.

10. The process for producing a silicon nitride porous body according to claim 6, wherein the molding aid is one or more materials selected from the group consisting of polyvinyl alcohol or its modified product, starch or its modified product, methyl cellulose, carboxymethyl cellulose, hydroxymethyl cellulose, polyethylene glycol, propylene glycol and glycerol.

11. The process for producing a silicon nitride porous body according to claim 6, wherein the amount of the water is from 5 to 30%, based on 100% of the mixture comprising the metallic silicon particles and the silicon oxide particles.

12. The process for producing a silicon nitride porous body according to claim 6, wherein the silicon nitride porous body has a honeycomb structure.

13. The process for producing a silicon nitride porous body according to claim 6, wherein said heat-treating comprises a first heat treatment step of holding the extrusion molded product in a nitrogen atmosphere at a temperature of from 1,200 to 1,400° C. for from 4 to 12 hours and a second heat treatment step of subsequently holding the heat-treated extrusion molded product at a temperature of from 1,500 to 1,800° C. for from 1 to 12 hours.

14. The process for producing a silicon nitride porous body according to claim 6, wherein the rate of temperature increase during said heat-treating is from 50 to 600° C./hr.

* * * * *